(12) United States Patent
Barberan Latorre

(10) Patent No.: US 12,384,087 B2
(45) Date of Patent: Aug. 12, 2025

(54) SYSTEM FOR MANUFACTURING A SUBSTRATE WITH A DECORATIVE DESIGN

(71) Applicant: Jesus Francisco Barberan Latorre, Castelldefels (ES)

(72) Inventor: Jesus Francisco Barberan Latorre, Castelldefels (ES)

( * ) Notice: Subject to any disclaimer, the term of this patent is extended or adjusted under 35 U.S.C. 154(b) by 288 days.

(21) Appl. No.: 17/500,300

(22) Filed: Oct. 13, 2021

(65) Prior Publication Data

US 2022/0118756 A1  Apr. 21, 2022

(30) Foreign Application Priority Data

Oct. 16, 2020 (EP) .................................... 20382907

(51) Int. Cl.
*B29C 48/00* (2019.01)
*B32B 38/00* (2006.01)
*B41F 19/00* (2006.01)

(52) U.S. Cl.
CPC ........ *B29C 48/0021* (2019.02); *B32B 38/145* (2013.01); *B41F 19/001* (2013.01)

(58) Field of Classification Search
None
See application file for complete search history.

(56) References Cited

U.S. PATENT DOCUMENTS

| 9,216,565 | B2 * | 12/2015 | Williams, II | ........... B44C 1/105 |
| 10,369,837 | B2 * | 8/2019 | Ryberg | ................ B41M 5/0017 |
| 2005/0045267 | A1 * | 3/2005 | Muvundamina | ......... C09J 11/04 |
| | | | | 137/170.1 |
| 2008/0314513 | A1 * | 12/2008 | Gauss | ................... B32B 38/145 |
| | | | | 156/387 |
| 2011/0064337 | A1 * | 3/2011 | Barthel | ............... B32B 38/1833 |
| | | | | 428/142 |
| 2019/0084321 | A1 | 3/2019 | Shigeta | |
| 2019/0235432 | A1 * | 8/2019 | Kawai | ................ G03G 15/5016 |

FOREIGN PATENT DOCUMENTS

| EP | 2329954 A1 | 6/2011 |
| JP | 2019059087 A * | 4/2019 |
| WO | 2004054769 A1 | 7/2004 |
| WO | 2016016864 A1 | 2/2016 |

OTHER PUBLICATIONS

JP2019059087A_machine_translation (Year: 2019).*
European Search Report for Corresponding EP Application No. 20382907.2., Mar. 19, 2021, 2 pages.

* cited by examiner

*Primary Examiner* — Michael N Orlando
*Assistant Examiner* — Abhishek A Patwardhan
(74) *Attorney, Agent, or Firm* — LUCAS & MERCANTI, LLP

(57) ABSTRACT

A system for manufacturing a substrate with a decorative design, such as an image and/or a relief, which has feed means for feeding a foil, digital printing means for printing the decorative design on the foil and coating means for coating the substrate with the foil. The system is configured for printing the foil with the digital printing device after supplying the foil with the feed means and before coating the substrate with the coating means.

7 Claims, 10 Drawing Sheets

SYSTEM FOR MANUFACTURING A SUBSTRATE WITH A DECORATIVE DESIGN

CROSS REFERENCE TO RELATED APPLICATION

This application claims the benefit of priority from European Patent Application No. 20382907.2 filed on Oct. 16, 2020, which is incorporated herein by reference.

TECHNICAL FIELD

The present invention relates to a system for manufacturing a substrate such as, for example, a panel or a profile, which incorporates a decorative design, such as an image and/or a relief, as surface finish adapted to the particularities of the substrate.

The invention is especially related to the coating of substrates by means of foils or laminar materials. The invention is particularly applicable to products for construction and furniture, such as panels for furniture, doors and floors, profiles for door and window frames, and so on.

STATE OF THE ART

At present, systems for applying decorative designs formed by images and/or reliefs that are arranged on a foil which coats the substrate are known. In these systems, the foil is supplied with the decorative design incorporated therein, subsequently performing the coating of the panels or profiles with the foil and the bonding with each other by means of adhesive glue applied between the foil and the substrate.

Today's demand increasingly calls for the continuous manufacture of substrates with sparsely repetitive decorative designs. This forces the foil feed or the continuous foil feed spool to be changed in order to replace the printed foils with each required decorative design and obtain a multiplicity of decorative designs manufactured by one same system.

The present invention aims to provide a system for manufacturing a substrate with a decorative design that enables substrates with various decorative designs to be obtained in a versatile manner.

OBJECT OF THE INVENTION

In order to solve the aforementioned objective, in addition to providing additional advantages that will be mentioned below, the present invention provides a system for manufacturing a substrate with a decorative design, such as an image and/or a relief, which comprises feed means for feeding a foil, digital printing means, in particular, inkjet printing means, of the decorative design on the foil and coating means for coating the substrate with the foil.

According to the invention, the system is configured for printing the foil with the digital printing device after supplying the foil with the feed means and before coating the substrate with the coating means. The incorporation of digital printing means in the system enables substrates with various decorative designs to be obtained in a versatile manner, allowing the required printing for each foil coating the respective substrate to be selected.

In this way, any desired appearance can be given to the substrate or even the decorative designs can be varied without the need to change the feed spool or the foils. Likewise, it enables various surfaces of the substrate to be coated such as the upper face, the lateral edges, the lower face (entirely or partially) and even complex surfaces, and so on, with different decorative designs for different selected surface areas.

This ability to arrange different decorative designs on one same foil increases the flexibility in the performance of the coating, being able, for example, to provide a foil with different decorative designs for different faces of the substrate, particularly, the upper face and the edges of a panel, or to give continuity to the decorative design between the different faces, etc.

The feed means for feeding the foil according to the invention may be configured for feeding the foil continuously, for example, by means of a foil feed spool. Alternatively, the feed means for feeding the foil may be configured for feeding the foil discontinuously, for example with means for foil-by-foil feeding.

It is envisaged that the system according to the invention comprises a processing unit functionally connected to the digital printing means, so that the processing unit is configured for printing a different decorative design for different substrates and/or foils. Preferably, the processing unit can be configured for printing a different decorative design depending on the physical features of the substrate and/or the foil such as, for example, dimensions, shape, material, surface roughness, etc. Thereby, it becomes possible to provide different decorative designs for different substrates in a flexible manner and in real time.

According to the invention, it is envisaged that physical features of the substrate and/or the foil can be detected, for example, by means of scanning or sensing the substrate and/or the foil or by means of instructions received in the processing unit. For this, the system can incorporate a scanner or sensor to, for example, directly detect physical features of the substrate and/or the foil or to detect a marking or identification of the substrate and/or the foil.

The system according to the invention may further comprise application means for applying adhesive glue in order to apply an adhesive glue on the substrate and/or the foil, so that the substrate and/or the foil are bonded together by means of the adhesive glue after coating. The application means for applying adhesive glue can be, for example, by means of lip, roller, spraying, digital printing, in particular inkjet, and so on.

Alternatively or complementarily, it is also envisaged that the foil may be supplied at least partially pre-glued.

Preferably, it is envisaged that the processing unit is functionally connected to the application means for applying adhesive glue, being configured for applying a different amount of adhesive glue depending on the physical features of the substrate and/or the foil such as, for example, dimensions, shape, material, surface roughness, etc. This enables a more flexible manufacture of substrates with decorative designs to be obtained, depending on the different physical features of the substrate and/or foil and, therefore, of the decorative design.

According to the invention, the coating means may be configured for shaping the foil on the surface of the substrate adapting the foil to the shape of the substrate.

The invention further envisages that the system according to the invention comprises first digital printing means of an image and second digital printing means of a relief, the system being configured so that the first means and the second means print the respective image and relief synchronously with each other. Thereby, it is possible to obtain reliefs in correspondence with images, enabling, for example, textures or haptic surfaces of natural materials, such as wood or stone, to be imitated or replicated.

DESCRIPTION OF THE FIGURES

The following figures have been included as part of the explanation of at least one practical embodiment of the invention.

DETAILED DESCRIPTION OF THE INVENTION

Figure 1:
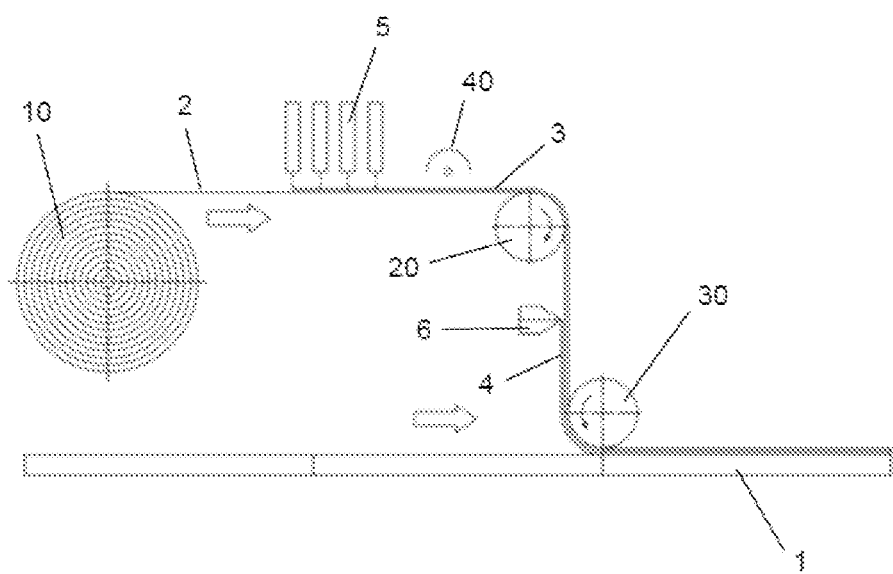
FIG. 1 shows a schematic view of a first embodiment of the system according to the invention.

The system uses a substrate (1) as a base product which is coated with a foil (2) on which an individualised decorative design is performed "in situ", in a continuous procedure with digital inkjet printing means (5, 40). Thus, the substrate (1) coated with the printed foil (2) is obtained, provided with a surface finish with the decorative design (3). Thereby, any desired appearance can be given to the substrate (1), for example, a panel or profile, depending on the decorative design (3) of the coating foil that is used.

The substrate (1) can be made of various materials such as, for example, wood derivatives (chipboard, medium-density fibreboard "MDF", high-density fibreboard "HDF" or plywood), plastic materials (PVC), cellulose-based materials (paper or cardboard), metal materials, etc. The foil (2) can be, for example, made of paper, PVC, HPL, CPL, etc.

The digital inkjet printing means (5, 40) comprise at least one digital inkjet print head (5) as well as digital printing curing or drying means (40) for curing and/or drying the printed ink which generates the decorative design.

The feed means for feeding (10; 90) the foil (2) can be continuous (10) or discontinuous (90). In the embodiments of FIGS. 1 to 7, the foil (2) is continuously fed with a feed spool (10), being guided by means of at least one guide roller (20, 60) to the coating of the substrate (1). In the embodiment of FIG. 8, the foil (2) is discontinuously fed, that is, foil by foil, from a stack (90) of foils.

Figure 2:
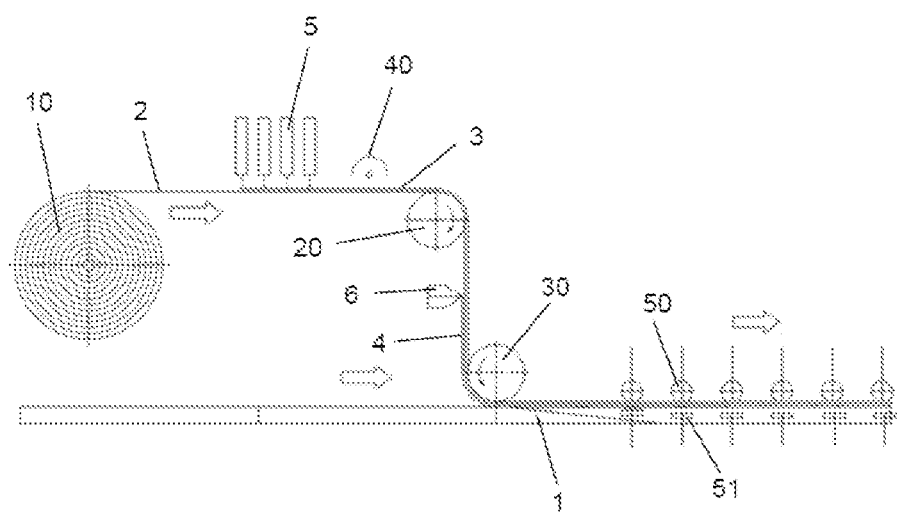
FIG. 2 shows a schematic view of a second embodiment of the system according to the invention, wherein unlike the first embodiment, the coating of the substrate with the foil comprises a shaping of the foil.

It is envisaged that in order to apply the adhesive glue (4) the system comprises application means for applying adhesive glue (6; 7, 70; 8, 9; 11, 80; 12, 13) configured for applying adhesive glue (4) to the substrate (1) and/or to the foil (2) to be bonded together after coating. The application of the adhesive glue (4) can be performed before or after the digital printing. In the variants of the system shown in the figures, the application of the adhesive glue (4) takes place after the application of the decorative design (3). However, according to the invention it is also envisaged that alternatively or complementarily it may take place before the application of the decorative design. The coating means (30; 50, 51) of the substrate (1) with the foil (2) comprise a pressure roller (30) to spread the foil (2) on the surface of the substrate (1), so that the foil (2) coats a surface of the substrate (1), particularly, a flat surface. In the embodiment of FIG. 2, the coating means (30; 50, 51) further comprise a shaping roller train (50, 51) for shaping the foil (2) on the surface of the substrate (1), in this case folding the foil (2) over the lateral edges of the substrate (1), but being able to be configured so that the foil (2) coats surfaces of the substrate (1) that are inclined with respect to each other or complex surfaces. By applying pressure with the coating means (30; 50, 51) the bond between the substrate (1) and the foil (2) is achieved.

As FIG. 1 shows, the continuous foil (2) is supplied from a feed spool (10), by means of a guide roller (20), the decorative design (3) being performed on the foil (2) by means of the digital inkjet print heads (5), followed by a subsequent curing or drying with digital printing curing or drying means (40).

The adhesive glue (4) is applied to the foil (2) with the decorative design (3), by means of an adhesive glue applicator lip (6) and, once the glue (4) is applied, the printed foil (2) already glued is attached to the substrate (1), coating the same, by means of pressing the foil (2) against the substrate (1) with the help of the pressure roller (30), thus obtaining the perfectly uniform final product.

The embodiment represented in FIG. 1 is not limiting, since as can be seen in the different figures, there are numerous variants depending on the elements used and the arrangement thereof in the system.

Thus, in the schematic embodiment in FIG. 2, what is described above is followed by a shaping phase by means of a shaping roller train (50, 51). Thus, the foil (2) coats the substrate (1) adapting to the shape of the substrate (1), so that both the front surface and the edges are coated by the foil (2).

The shaping roller train (50, 51) consists of a longitudinal train of pressure tools (normally wheels with different properties), which perform the shaping, post-shaping or profiling of the foil (2) on the substrate (1) in the direction of the progress of the substrate to be coated. Other strategically located elements could be used for adhering the foil (2) to the substrate, adapting it to the shape of the substrate (1) and until obtaining, at the end of the processing, the final shape thereof, integrated with the substrate (1).

Figure 3:
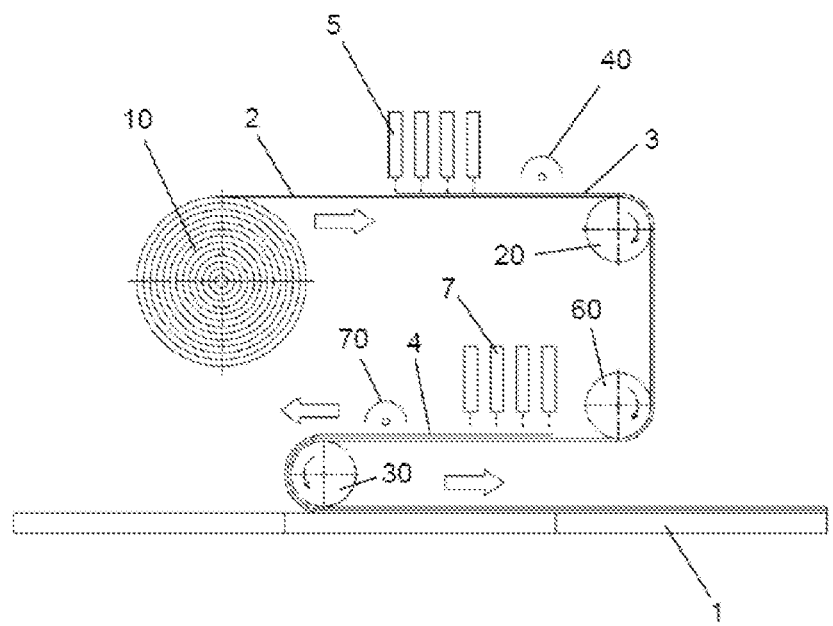
FIG. 3 shows a schematic view of a first variant of the first embodiment of the system according to the invention, wherein the adhesive application is performed by means of digital inkjet printing instead of by means of lip.

Similarly, in the embodiment of FIG. 3, after digital inkjet printing, the adhesive glue (4) is applied to the foil (2), after the foil (2) is guided by means of two continuous foil guide rollers (20 and 60). In this variant, the application of the adhesive glue (4) is performed by means of adhesive glue digital inkjet print heads (7), performing a subsequent curing or drying with adhesive glue curing or drying means (70) before applying the rotary pressure roller (30) in the direction of progress of the substrate (1).

Figure 4:
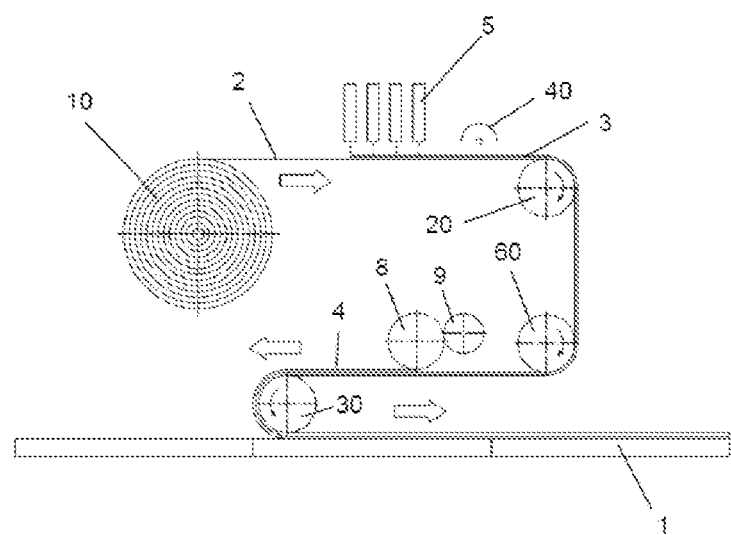
FIG. 4 shows a schematic view of a second variant of the first embodiment of the system according to the invention, wherein the adhesive application is performed by means of roller instead of by means of lip.

Moreover, the embodiment of FIG. 4 follows the same process, but the adhesive glue (4) being applied on the foil (2) by means of an applicator roller (8), in cooperation with an adhesive glue dosing roller (9), for dosing an amount of glue (4) on the applicator roller (8) by means of the relative rotation and movement between the applicator roller (8) and dosing roller (9).

Figure 5:
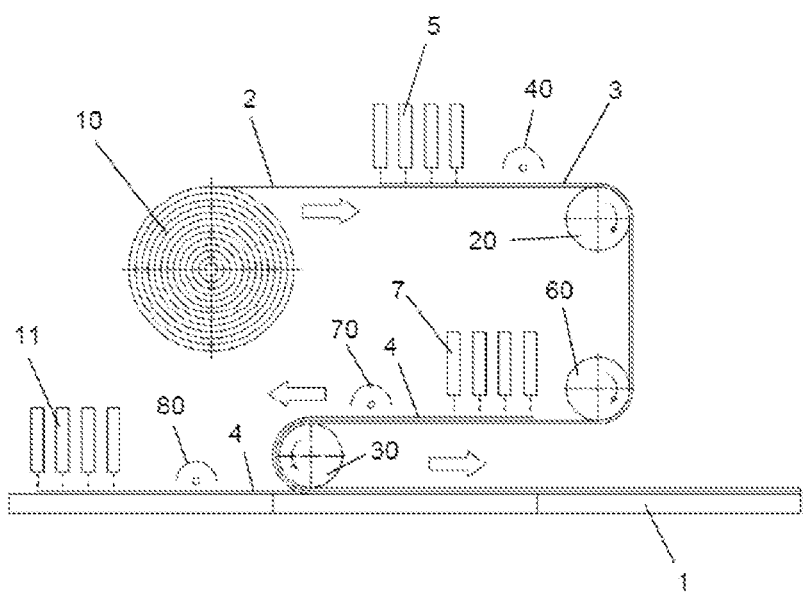
FIG. 5 shows a schematic view of a third embodiment of the system according to the invention, wherein unlike the first embodiment, the adhesive application is performed to both the foil and the substrate.
Figure 6:
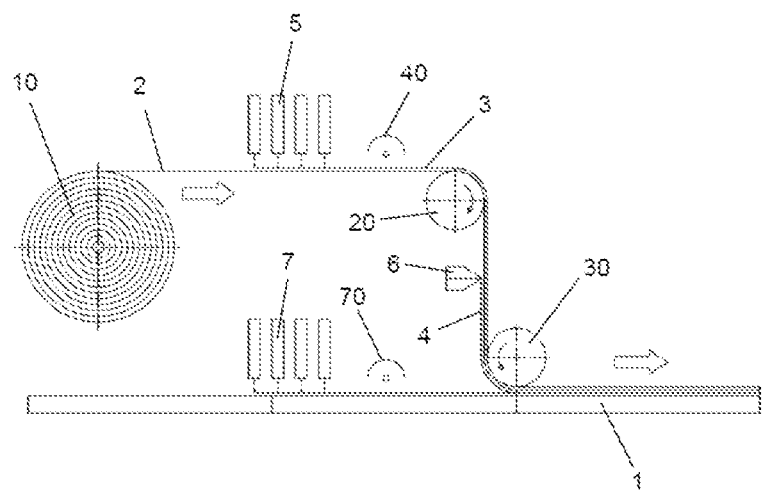
FIG. 6 shows a schematic view of a first variant of the third embodiment of the system according to the invention, wherein the adhesive application to the foil is performed by means of lip instead of by means of digital inkjet printing.
Figure 7:
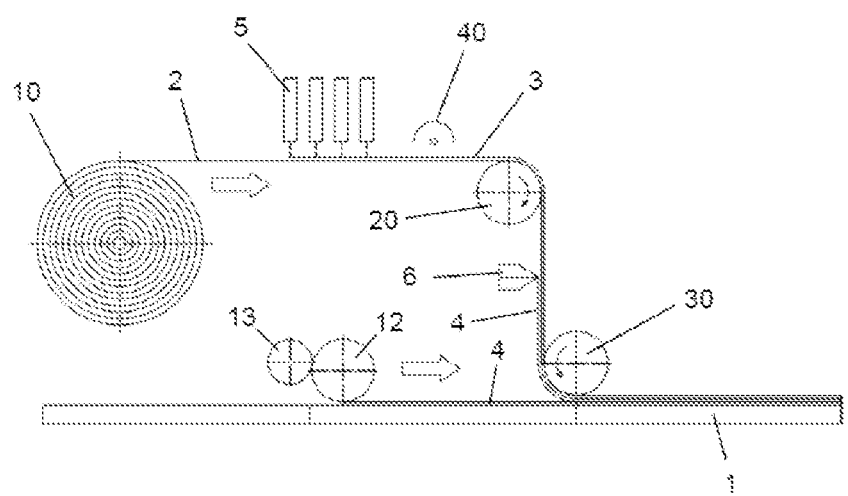
FIG. 7 shows a schematic view of a second variant of the third embodiment of the system according to the invention, wherein the adhesive application to the foil is performed by means of lip instead of by means of digital inkjet printing and the adhesive application to the substrate is performed by means of roller instead of by means of digital inkjet printing.
Figure 8:
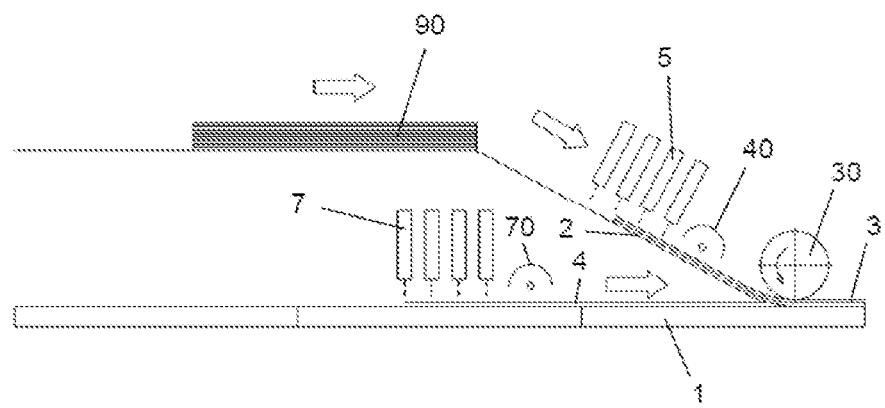
FIG. 8 shows a schematic view of a fourth embodiment of the system according to the invention, wherein unlike the previous embodiments, the foil feed is performed discontinuously, that is, foil by foil, instead of by means of a continuous feed spool.

Likewise, in the embodiments of the system represented in FIGS. 5 to 7, the step of digital printing by means of the digital inkjet print heads (5) of the decorative design (3), which is followed by a subsequent curing or drying with digital printing curing or drying means (40), the adhesive glue (4) is applied on the foil (2) and/or the substrate (1) with variants regarding the application of the glue (4). Thus, in FIG. 5, the adhesive glue (4) is applied on the foil (2) by means of digital inkjet print heads (7), and on the substrate (1), also by means of digital inkjet print heads (11), followed, in both cases, by a subsequent curing with adhesive glue curing or drying means (70; 80), before applying the pressure roller (30).

Unlike FIG. 5, in FIG. 6 the adhesive glue (4) is applied on the foil (2) by means of a lip (6), without being subjected to subsequent curing, and once the adhesive glue (4) has been applied, it is pressed against the substrate (1) by means of the pressure roller (30). Furthermore, FIG. 7 shows an embodiment that differs from that of FIG. 6 in that the adhesive glue (4) is applied on the substrate (1) by means of an applicator roller (12), in cooperation with a dosing roller (13).

FIG. 8 represents a procedure wherein the feed material, or foil (2), is discontinuously supplied from a stack (90) of foils and the application of the adhesive glue (4) is performed only to the substrate (1) by means of digital inkjet print heads (7), followed by a subsequent curing with adhesive glue curing or drying means (70).

As adhesive glue curing or drying means (40) or digital printing means (70, 80), it is possible to use, for example, electromagnetic radiation, UV, IR or electron lamps or by means of hot air drying, and so on.

Figure 9:
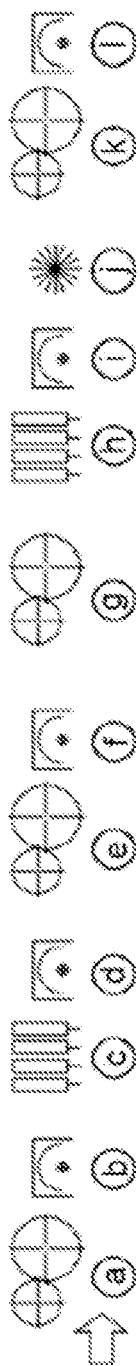
FIG. 9 shows a schematic view of the successive steps of an exemplary embodiment of the manufacturing process of a substrate with a decorative design performable with a system according to the invention.

According to the invention, the system may include complementary means for preparing the substrate (1) and/or the foil (2) such as, for example, means for priming the substrate (1) and/or the foil (2), a protective layer for the foil (2), a base layer for performing the relief on the foil (2), means for removing material from the mixture of drops injected by means of inkjet to perform the relief on the foil (2), etc. FIG. 9 shows the following steps of a possible process that can be performed using a system according to the invention:
 a) Applying a priming to the foil.
 b) Curing the priming.
 c) Applying a decorative design by means of inkjet.
 d) Curing or semi-curing the print.
 e) Applying a protective layer for the printed layer.
 f) Curing or semi-curing the protective layer.
 g) Applying the base layer of liquid material in which the relief will be performed.
 h) Injecting by means of inkjet droplets of material for mixing with the layer of liquid material.
 i) Curing process on the mixture and the rest of the material.
 j) Removing the mixed material by means of mechanical means.
 k) Applying a layer of finish material.
 l) Curing the finish layer.

It would also be possible to use substrates (1) and/or foils (2) already prepared, previously, to receive the decorative design (3) and/or the adhesive glue (4), the application of priming layers, for example, therefore not being necessary. It could also have pre-glued foils (2), which would prevent the application of adhesive glue (4) to the foil (2) during the process.

The system can be advantageously implemented to replicate, in a continuous process, different decorative designs on the foil (2) for coating the substrate (1) or, without the need to change the spool (10) or the sheets (90).

Figure 10:
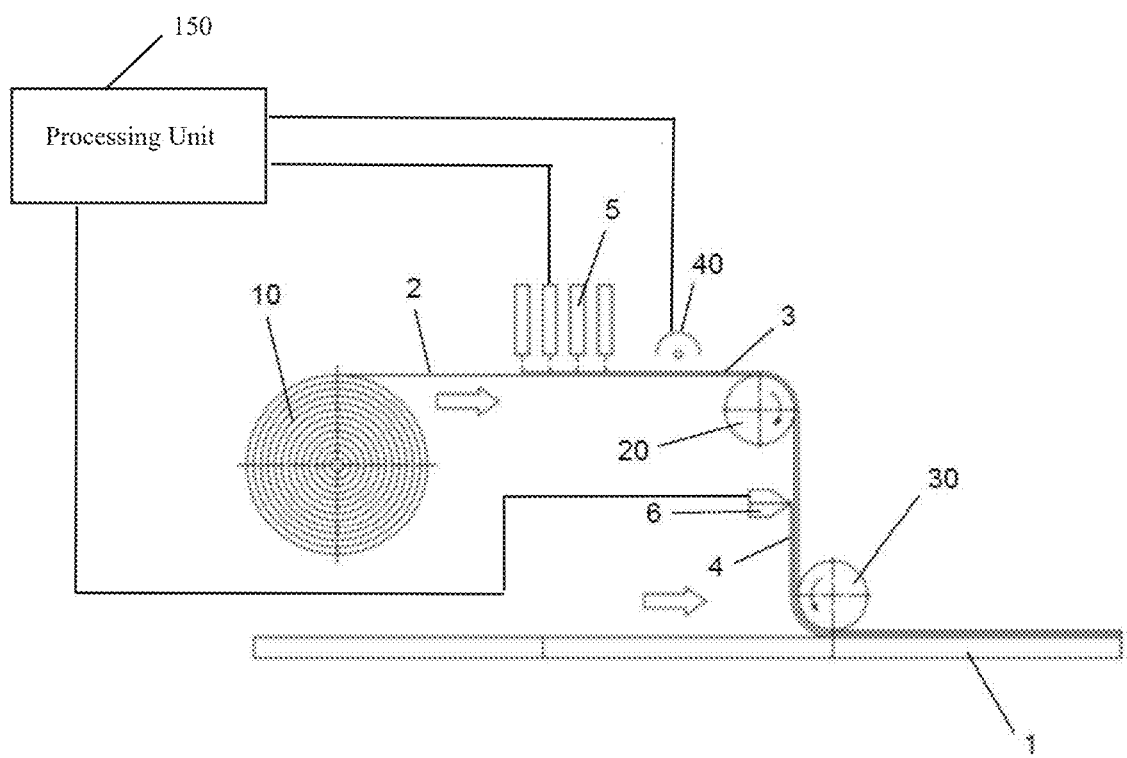
FIG. 10 shows a schematic view of a fifth embodiment of the system according to the invention.

FIG. 10 shows a system in accordance with another embodiment. The system shown in FIG. 10 includes the components of the system of FIG. 1. In addition, the system includes a processing unit 150 functionally connected to the digital inkjet printing means (5, 40). The processing unit is configured to print a different decorative design for different substrates and/or foils. The processing unit 150 is also functionally connected to the application means for applying adhesive glue (6). The processing unit 150 is configured to apply a different amount of adhesive glue depending on physical features of the substrate and/or the foil.

The invention claimed is:

1. A system for manufacturing a substrate with a decorative design, the system comprising:
 a feed means for feeding a foil,
 a digital printing means for printing the decorative design on the foil, and
 a coating means for coating the substrate with the foil,
 wherein the system is configured to print the foil with the digital printing device after supplying the foil with the feed means and before coating the substrate with the coating means,
 wherein the system comprises a processing unit functionally connected to the digital printing means,
 wherein the system is configured for printing a different decorative design for different substrates and/or foils based on physical features, including dimensions, material and/or surface roughness, of the substrate and/or foils, the system being configured to coat a plurality of surfaces of the substrate with one foil having respective decorative designs corresponding to different selected surfaces of the substrate, the plurality of surfaces including at least one of a lateral face, a lower face, or a complex surface of the substrate.

2. The system for manufacturing a substrate, according to claim 1, further comprising an application means for applying adhesive glue in order to apply an adhesive glue on the substrate and/or the foil, so that the substrate and/or the foil are bonded together by means of the adhesive glue after the coating.

3. The system for manufacturing a substrate, according to claim 2, wherein the processing unit is functionally connected to the application means for applying adhesive glue, wherein the system is configured to apply a different amount of adhesive glue depending on physical features of the substrate and/or the foil.

4. The system for manufacturing a substrate, according to claim 1, wherein the coating means is configured to shape the foil on a surface of the substrate adapting the foil to the shape of the substrate.

5. The system for manufacturing a substrate, according to claim 1, wherein the digital printing means of the decorative design comprises a first digital printing means of an image and a second digital printing means of a relief, wherein the system is configured so that the first digital printing means and the second digital printing means print the respective image and relief synchronously with each other.

6. The system of claim 1, wherein the system is configured to coat the plurality of surfaces with a continuous design that covers the plurality of surfaces.

7. The system of claim 1, wherein the system is configured to coat the plurality of surfaces of the substrate with a foil having a first decorative design corresponding to a first surface of the substrate and a second decorative design corresponding to a second surface of the substrate.

\* \* \* \* \*